United States Patent Office 3,754,015
Patented Aug. 21, 1973

3,754,015
NOVEL PARACYCLOPHANES AND PROCESS FOR PREPARATION
Eddie Hedaya, White Plains, N.Y., assignor to Union Carbide Corporation
No Drawing. Continuation of application Ser. No. 555,267, June 6, 1966. This application July 22, 1969, Ser. No. 849,557
Int. Cl. C07c *143/68*
U.S. Cl. 260—456 P          1 Claim

ABSTRACT OF THE DISCLOSURE

Novel mono- and di-substituted paracyclophanes having utility in the coatings field are conveniently prepared by the reaction of an oxalylhalide with [2.2]-paracyclophane to give a haloformyl-substituted [2.2]-paracyclophane which thereafter can serve as a starting material for various paracyclophane derivatives.

---

This application is a continuation of application Ser. No. 555,267, filed June 6, 1966, and now abandoned.

This invention relates to novel paracyclophanes and to a process for their preparation. In one aspect, this invention is directed to novel [2.2]-, [2.3]- and [3.3]-paracyclophanes which are useful in a wide variety of applications.

One of the more important problems in synthetic chemistry has been the introduction of substituents through formation of new carbon to carbon bonds. In most instances this can be accomplished by conventional methods described in the literature. For example, substituents can be introduced via new carbon to carbon bonds by carboxylating Grignard Reagents or other organometallic derivatives. However, in some instances attempts to prepare the Grignard Reagent or organometallic derivative are unsuccessful. Typical of compounds for which Grignard reagents cannot easily be prepared are the [2.2]-paracyclophanes. Hence, prior to the instant invention it has not been possible by conventional methods of synthesis to introduce substituents directly into the aliphatic side chain of [2.2]-paracyclophanes through the formation of a new carbon to carbon bond.

Accordingly, one or more of the following objects will be achieved by the practice of this invention. It is an object of this invention to provide a class of novel paracyclophanes. Another object of this invention is to provide a class of novel paracyclophanes which are useful in a wide variety of applications. A further object is to provide novel paracyclophanes which are useful in the preparation of polymeric materials. Another object of this invention is to provide a novel process for the preparation of the novel paracyclophanes of this invention. These and other objects will readily become apparent to those skilled in the art in the light of the teachings herein set forth.

In one aspect, this invention is directed to novel paracyclophanes and to a process for their preparation. The novel paracyclophanes of this invention can be represented by the following general formula:

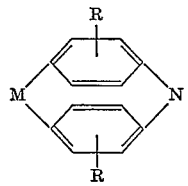

wherein M and N represent

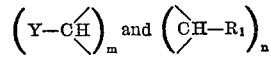

respectively, or either M or N can represent 1-propylene, i.e., —CH$_2$—CH=CH—, in addition to one of the aforesaid groups, or both M and N can each represent 1-propenyl groups; R represents hydrogen, halogen, hydroxyl, amino, hydrocarbyl, halohydrocarbyl, or a group composed of carbon, hydrogen and at least one member selected from the group of oxygen and nitrogen, $R_1$ represents haloformyl, amino, hydrocarbyl, halohydrocarbyl, oxo (=o), oximino (=N—OH), or a group composed of carbon, hydrogen, and at least one member selected from the group of oxygen, nitrogen and sulfur, Y represents hydrogen or $R_1$, and $m$ and $n$ have a value of from 2 to 3 and need not be the same throughout the molecule, with the proviso that when $m$ and $n$ are both 2, $R_1$ is not oxo, oximino, tosylate, or acetate.

Preferred paracyclophanes encompassed by the above formula are those wherein R represents halogen, e.g., chloro, bromo, fluoro, and iodo, and R and $R_1$ individually represent alkyl, alkenyl, alkylene, aryl, alkaryl, aralkyl, cycloalky, cycloalkeny, bicycloalkyl, bicycloalkenyl, haloalkyl, haloaryl, haloalkaryl, halocycloalkyl, alkoxyalkyl, halocarbonyl, alkoxyaryl, aminoalkyl, aminoaryl, alkylaminoalkyl, dialkylaminoalkyl, dialkylaminoalkoxyalkyl, pyridyl (ortho, meta and para), alkylpyridyl, piperidyl, piperidylalkyl, alkylpiperidyl, piperidinoalkyl, pyrimidyl, alkylpyrimidyl, pyrimidinylalkyl, pyrazolyl, pyrazyl, pyrazylalkyl, N-alkoxycarbonylpiperazinylalkyl, piperizinyl, N-alkylpiperazinylalkyl, morpholinyl, alkylmorpholinyl, 1,2,5,6-tetrahydropyridyl, N-alkyl-1,2,5,6-tetrahydropyridyl, N-aryl - 1,2,5,6 - tetrahydropyridyl, N-aralkyl - 1,2,5,6 - tetrahydropyridyl, carbamyl, alkylcarbamyl, cycloalkylcarbamyl, N-heterocyclocarbamyl and the like.

Particularly preferred paracyclophanes are those wherein the R variable contains up to 18 carbon atoms and wherein at least one of the R and $R_1$ variables is a heterocyclic group composed of carbon, hydrogen and from 1 to 2 ring nitrogen and/or oxygen atoms.

As employed throughout the specification and appended claims, the term [2.2]-paracyclophane refers to the diparaxylyene structure:

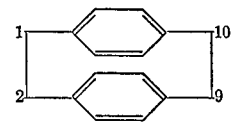

while the [3.3]-paracyclophane designates the structure wherein the aromatic groups are joined by propylene:

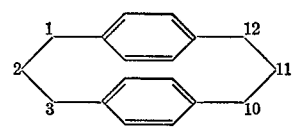

The [2.3]-paracyclophanes refers to the unsymmetrical structures having ethylene and propylene groups linking the two aromatic rings.

Illustrative novel paracyclophanes encompassed by the aforementioned formula include, among others, the halocarbonyl-[2.2]-([2.3]-), ([3.3]-)-paracyclophanes, e.g., 1-chlorocarbonyl-[2.2]-paracyclophane,
1-bromocarbonyl-[2.2]-paracyclophane,
1,9-di(chlorocarbonyl)-[2.2]-paracyclophane,
1-chlorocarbonyl-[2.3]-paracyclophane,
1,9-di(chlorocarbonyl)-[2.3]-paracyclophane,
1-chlorocarbonyl-[3.3]-paracyclophane,
1,10-dichlorocarbonyl-[3.3]-paracyclophane, and the like;

the carboxamido-[2.2] - ([2.3]-), ([3.3]-) - paracyclophanes, e.g., 1-carboxamido-[2.2]-paracyclophane,
1,9-dicarboxamido-[2.2]-paracyclophane,
1,10-dicarboxamido-[3.3]-paracyclophane, and the like;

the carboxy-[2.2]-([2.3]-), ([3.3]-) - paracyclophanes, e.g., 1 - carboxy-[2.2]-paracyclophane, 1,10 - dicarboxy-[3.3]-paracyclophane, and the like; the N,N-dialkylcarboxamido-[2.2]-([2.3]-), ([3.3]-)-paracyclophane, e.g., 1 - (N,N - dimethylcarboxamido)-[2.2]-paracyclophanes, 1,10 - di(N,N - dimethylcarboxamido)-[2.3]-paracyclophane, and the like; the carbohydrocarbyloxyl-[2.2]-([2.3]-), ([3.3]-)-paracyclophanes, e.g., 1-carbomethoxy-[2.2]-paracyclophane, 1,9-dicarbomethoxy)-[2.2]-paracyclophane, and the like; the hydroxyhydrocarbyl-[2.2]-([2.3]-), ([3.3]-)-paracyclophanes, e.g., 1-hydroxymethyl-[2.2]-paracyclophane, 1 - hydroxypropyl-[3.3]-paracyclophane, and the like; the hydrocarbylcarbamyl-[2.2]-([2.3]-), ([3.3]-) - paracyclophanes, e.g., 1 - benzoyl-[2.2]-paracyclophane, 1,9-diacetoxy - [2.3] - paracyclophane, and the like; the hydrocarbylcarbonyloxyalkyl-[2.2]-([2.3]-), ([3.3]-)-paracyclophanes, e.g., 1-acetoxymethyl-[2.2]-paracyclophane, and the like; the aminoalkyl-[2.2]-([2.3]-), ([3.3]-)-paracyclophanes, e.g., 1,9-di(aminomethyl)-[2.2]-paracyclophane, and the like; the N,N - dialkylaminoalkoxy-[2.2]-([2.3]-), ([3.3]-)-paracyclophanes, e.g., 1-(N,N-dimethylaminoethoxy)-[2.2]-paracyclophane, and the like; the tosyl-substituted-([2.3]), ([3.3]-)-paracyclophanes, e.g., 2 - tosyl-[3.3]-paracyclophane, 2,11 - di-(tosyloxymethyl)-[3.3]-paracyclophanes, and the like; and the paracyclophanes having substituents attached to cycloaliphatic carbon atoms by a double bond, i.e., the methylene ($CH_2=$), oxo ($O=$) and oximino ($HON=$) groups.

Further illustrative novel compositions encompassed by the aforementioned general formula include, among others, 1-methylene-[2.2]-paracyclophane,
1-hydroxymethyl)-[2.2]-paracyclophane,
2-(tosyloxymethyl)-[2.3]-paracyclophane,
1-(percarbo-t-butoxy)-[2.2]-paracyclophane,
1,9-(dihydroxymethyl)-[2.2]-paracyclophane,
1,9-(dihydroxymethyl)-[2.2]-paracyclophane,
1,9-(ditosyloxymethyl)-[2.2]-paracyclophane,
1,10-(ditosyloxymethyl)-[2.2]-paracyclophane,
10-acetoxy-[2.3]-paracyclophane,
[2.3]-paracyclophan-10-one,
[2.3]-paracyclophan-2-one-oxime,
2-(2-dimethylaminoethoxy)-[2.3]-paracyclophane,
[2.3]-paracyclophan-10-ol,
[2.3]-paracyclophane-10-tosylate,
2-(tosyloxymethyl)-[2.3]-paracyclophane,
[3.3]-paracyclophan-2,11-diol,
[3.3]-paracyclophan-2,11-diacetate,
[3.3]-paracyclophane-2,11-dione,
[3.3]-paracyclophan-2,1-diene,
[3.3]-paracyclophan-2,11-diene,
[3.3]-paracyclophan-2-acetate-11-ene, and the like.

The novel paracyclophanes of this invention, as hereinafter indicated, are conveniently prepared from the haloformyl-[2.2]-paracyclophanes. The haloformyl derivative is itself prepared by the reaction of [2.2]-paracyclophane and oxalyl chloride in the presence of a peroxide catalyst. The following reaction illustrates the preparation of a monosubstituted [2.2]-paracyclophane.

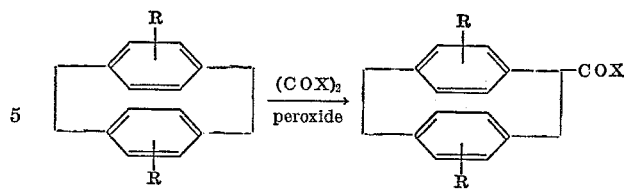

wherein X represents chlorine and R is as previously indicated.

The reaction of the acid chloride and [2.2]-paracyclophane can be carried out in solution using an inert, normally liquid solvent such as a saturated aliphatic or aromatic hydrocarbon or halogen derivative thereof, as for instance, heptane, hexane, pentane, benzene, acetonitrile, carbon tetrachloride, chlorobenzene, diphenylether, and the like. In practice, chlorobenzene is the preferred solvent.

Reaction temperature can also vary broadly, typically in the range of from about 80° C. to about 150° C., and preferably in the range of from 80° C. to about 100° C. In any given instance, however, the temperature should not be so high as to decompose the product yet it should be high enough so that the paracyclophane is soluble. The particular temperature will be dependent to a large extent upon the choice of solvent employed.

It has been found that the ratio of reactants is critical in order to optimize the yield of the mono-substituted acid chloride. Experimental work has indicated that a molar ratio of [2.2]-paracyclophane to oxalyl chloride of at least 1:5, provides the highest yield of the mono-acid chloride. Moreover, a further income in yield is achieved by the slow dropwise addition of the peroxide in oxalyl chloride to the paracyclophane. The use of an inert atmosphere such as nitrogen was found to have no apparent effect on the reaction.

Preparation of the di-substituted [2.2]-paracyclophanes

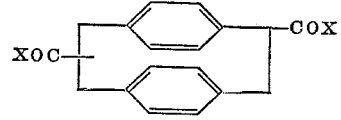

is conveniently effected in a similar manner but by the batchwise addition of peroxide at intervals of about 24 hours. The ratio of the paracyclophane to oxalyl chloride should initially be about 1:5. For further additions the ratio can be in the range of at least about 1:5 to about 1:10.

One of the more remarkable features of the reaction is that the only disubstituted product isolated is the one with chloroformyl groups on opposite ethylene bridges.

Although benzoyl peroxide has proved to be the most satisfactory peroxide utilized, other peroxides can equally as well be employed. For example, the reaction can be promoted with t-butylperbenzoate, tertiary-butyl peroxide, and the like. It has been found that the amount of peroxide added dropwise to the [2.2]-paracyclophane should be such as to provide a total ratio of peroxide to paracyclophane of 1 to 5.

Although oxalyl chloride is preferred, other formylating and/or carboxylating reagents can also be employed, such as oxalyl bromide, dimethyl oxylate, methyl glyoxyl, and the like.

Recovery and isolation of the mono- or di-substituted haloformyl product can be effected by conventional techniques, as indicated in the examples.

From the mono- or di-haloformyl-substituted [2.2]-paracyclophanes, a wide variety of novel compositions can be synthesized. For example, the perester, 1-(percarbo - t - butoxy)-[2.2]-paracyclophane, is prepared by treating 1-chloroformyl-[2.2]-paracyclophane with t-butylhydroperoxide in pyridine as a solvent at a temperature of from about 0° to about 5° C., the product being isolated by chromatography. The amides are prepared by reacting the chloroformyl-[2.2]-paracyclophane with an amine or ammonia at room temperature in an organic solvent. Recovery of the amide can be effected by conventional techniques. Thereafter, the amide can be reduced to the amine with lithium aluminum hydride.

As indicated in Example 2, the carbomethoxy ester is prepared by reacting the chloroformyl-[2.2]-paracyclophane formed in situ with methanol and recovery of the ester product by chromatography. The alcohol can be prepared by reduction of the ester with lithium aluminum hydride in ether and the aldehyde by reduction of the corresponding acid. From the alcohol, the tosylate is conveniently synthesized by reacting it with toluene sulfonyl chloride in pyridine at low temperatures. Other derivatives of the haloformyl-[2.2]-paracyclophanes can also be synthesized as indicated in the examples.

The [2.3]- and [3.3]-paracyclophanes are prepared by the ring expansion of the tosyloxymethyl-substituted [2.2]-paracyclophanes. The ring expansion is accomplished by the solvolysis of the α-tosyloxy methyl-[2.2]-paracyclophane in acetic acid. If the starting [2.2]-paracyclophane has two tosyloxymethyl groups, i.e., one on each of the ethylene bridges, then ring expansion to the [3.3]-paracyclophane can be accomplished:

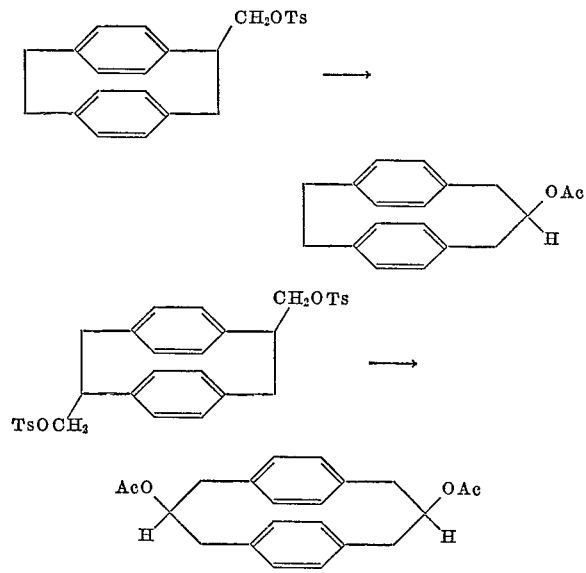

After the desired [2.3]- or [3.3]-paracyclophane has been obtained, numerous derivatives can be prepared by substitutions or reaction of the acetate group in a manner analogous to that indicated for the [2.2]-paracyclophanes.

In practice, the novel paracyclophanes of this invention are a useful class of compositions having utility in a wide variety of fields. For example, it is known that the [2.2] - paracyclophanes polymerize to relatively high molecular weight polymeric products which are insoluble in common organic solvents at room temperature, are moisture resistant and exhibit low permeability to most vapors. Moreover, the polymers are flexible over a wide range of temperatures and hence are useful as dielectric material in electronic applications, as protective coatings, packaging materials, and the like. The preparation of paraxylylene polymers is described by Hail in U.S. 2,914,-489 wherein mono- and dihalogenated paraxylylenes are pyrolyzed at temperatures between about 520° and 765° C.

The novel compositions of this invention are also useful for the preparation of polymers having similar utility and additionally are characterized by the presence of various functional groups along the polymer chain. These functional groups are useful as crosslinking sites to render the polymer product less flexible, as aids in pigmentation of the product to a desired color, or to enhance adhesion properties.

The ring expanded paracyclophanes, i.e., the [2.3]- and [3.3]-paracyclophanes having functional groups are also useful in a wide variety of fields. For example, the paracyclophanes containing aliphatic unsaturation can be epoxidized with peracetic acid to provide mono- or diepoxides which are useful as plasticizers and stabilizers for vinyl resins, or as intermediates in the preparation of epoxy resins which themselves are useful as laminates, surface coatings, encapsulating materials and the like. The paracyclophanes containing amine groups are likewise useful in the epoxy resin field as curing and crosslinking agents. The diacids and diesters are useful as condensation monomers for the preparation of polymer materials having utility as surface coatings, and the like.

In the following examples, all infrared spectra were obtained on a Beckmann IR–5A instrument in potassium bromide pellets. Ultraviolet spectra were recorded on a Beckmann DK–2 spectrophotometer. Unless otherwise indicated, solvents were spectrograde 95 percent ethanol or methylene chloride. NMR spectra were obtained on a Varian A–60 instrument and data are expressed in p.p.m. relative to tetramethylsilane. All melting points are uncorrected.

EXAMPLE 1

1-(percarbo-t-butoxy)-[2.2]-paracyclophane

Diparaxylylene (11.1 g., 0.053 mole) and oxalyl chloride (17.8 g., 0.136 mole) were heated with stirring in 178 milliliters of chlorobenzene. Benzoyl peroxide (2.22 g.) in oxalyl chloride (17.8 g., 0.136 mole) was added dropwise and the temperature maintained at 90° C. for 24 hours. Unreacted starting material (4.8 g., 43.5%) was collected from the cooled reaction mixture. The filtrate was concentrated in vacuo and redissolved in 80 milliliters of dry pyridine. Distilled t-butyl hydroperoxide (25 g., 0.278 mole) was added to the solution at 0–5° C. After 24 hours at 0° C. the reaction mixture was added to 60 milliliters of conc. hydrochloric acid in 225 g. of ice and extracted with methylene chloride. The extract was washed with water, dried over magnesium sulfate, and concentrated in vacuo. The resulting gum (11.0 g.) was chromatographed on Florisil (100 g., 60/100 mesh) with an ether pentane mixture as eluant. The crude eluted product, 2.5 grams, was recrystallized from methylene chloride and pentane to provide a yield of 1.8 grams (10.5% gross, 18.5% net) of white solid, having M.P. 97–97.5° C.

The infrared spectrum shows carbonyl absorption at 5.72μ and characteristic diparaxylylene absorption at 12.28μ and 14.0μ. The NMR spectrum in chloroform-d shows resonance at 6.70–6.41 p.p.m. (aromatic protons, multiplet); 4.26–3.20 p.p.m. (benzylic protons, multiplet); 3.12 p.p.m. (bridge protons, singlet); and 1.30 p.p.m. (t-butyl protons, singlet) in an area ratio of 8:3:4:9.

Analysis.—Calcd. for $C_{21}H_{26}O_3$ (percent): C, 77.75; H, 7.46. Found (percent): C, 77.77; H, 7.69.

EXAMPLE 2

1-(carbomethoxy)-[2.2]-paracyclophane

[2.2]-paracyclophane (50.0 grams, 0.24 mole) and oxalyl chloride (75.0 grams, 0.06 mole) were heated to 90° C. with stirring in 800 milliliters of chlorobenzene. Benzoyl peroxide (10.0 grams, 0.04 mole) in oxalyl chloride (75.0 grams, 0.06 mole) was added dropwise and the temperature maintained at 90° C. for 24 hours. Upon cooling 15.0 grams (30 percent of starting material) was filtered off. The filtrate was concentrated in vacuo and redissolved in methylene chloride. Methanol (350 milliliters) was added to the solution and stirred overnight. The mixture was concentrated in vacuo and chromatographed on Florisil (900 grams, 60/100 mesh) with ether/pentane as eluant. Pure pentane eluted a small amount of [2.2]-paracyclophane along with substantial amounts of methyl benzoate. Ether/pentane (2–10%)

eluted 11.0 grams of product (25%). Recrystallization twice from hot hexane yielded the analytical sample, melting point 96.5–97.5° C.

Infrared bands characteristic of the [2.2]-paracyclophane system were observed at 12.2μ and 14.0μ along with ester absorption. The NMR spectrum in chloroform-d shows resonances at 7.3–6.9 p.p.m. (aromatic protons, multiplet), 4.18–3.80 p.p.m. (benzylic proton, multiplet), 3.57 p.p.m. (methyl protons, singlet), 3.45–3.22 p.p.m. (benzylic protons, multiplet), and 2.86 p.p.m. (bridge protons, singlet) in an area ratio of 8:1:3:2:4.

*Analysis.*—Calcd. for $C_{18}H_{18}O_2$ (percent): C, 81.17; H, 6.81. Found (percent): C, 81.48; H, 6.82.

EXAMPLE 3

1-(hydroxymethyl)-[2.2]-paracyclophane 1-(carbomethoxy)-[2.2]-paracyclophane (8.77 grams, 0.033 mole) in 64 milliliters of 25% benzene/ether was added dropwise to a stirring mixture of lithium aluminum hydride (2.0 grams, 0.05 mole) in 190 milliliters of ether. After stirring for 20 hours at room temperature, the excess lithium aluminum hydride was hydrolyzed by successive addition of 2 milliliters water, 2 milliliters 10% sodium hydroxide, and 4 milliliters of water. The ethereal layer was decanted off and the inorganic product washed repeatedly with methylene chloride. The combined organic extracts were dried over magnesium sulfate and concentrated in vacuo to give a white solid. Sublimation at 0.1 millimeter pressure and 140° C. yielded 6.4 grams (81%) of product, melting point 136.5–137.5° C.

The infrared spectrum shows hydroxyl absorption at 3.0 and the characteristic diparaxylylene absorptions at 12.4μ and 14.0μ. The NMR spectrum in chloroform-d shows resonance at 6.57–6.40 p.p.m. (aromatic protons, multiplet); 4.15–3.18 p.p.m. (a benzylic and non-benzylic protons, multiplet); 3.04 p.p.m. (bridge protons, singlet); 2.60–2.22 p.p.m. (benzylic and non-benzylic protons, multiplet); and 1.96 p.p.m. (hydroxyl proton, singlet) in an area ratio of 8:4:4:1:1.

*Analysis.*—Calcd. for $C_{17}H_{18}O$ (percent): C, 85.80; H, 7.61. Found (percent): C, 85.61; H, 7.56.

EXAMPLE 4

2-dimethylaminoethoxy-1-([2.2]-paracyclophanyl)-methane

Sodium hydride (50% in mineral oil, 0.9 gram) was added to 1-(hydroxymethyl)-[2.2]-paracyclophane (0.9 gram, 3.8 millimoles) in 190 milliliters of dry benzene and stirred under nitrogen for 0.5 hour. β-Dimethylaminoethyl bromide hydrobromide (1.2 grams) was added to the mixture and stirred at reflux for 40 hours. Hydrochloric acid 10% (180 milliliters), was added dropwise to the cooled mixture and the resulting emulsion broken up by addition of 95% ethanol. The aqueous layer was separated out, basified with 10% sodium hydroxide and extracted with methylene chloride. The extract was washed with water, dried over magnesium sulfate and concentrated in vacuo to give the crude product. Recrystallization from hot hexane yielded 1.0 gram (85%) of white solid. A second recrystallization gave the analytical sample, melting point 83.0–84.0° C. The infrared spectrum shows ether absorption around 9.0μ and the 2,2-paracyclophane absorption at 12.43μ and 13.92μ.

*Analysis.*—Calcd. for $C_{21}H_{27}NO$ (percent): C, 81.50; H, 8.81; N, 4.52. Found (percent): C, 81.28; H, 8.90; N, 4.46.

EXAMPLE 5

1-(tosyloxymethyl)-[2.2]-paracyclophane 1-(hydroxymethyl)-[2.2]-paracyclophane (3.04 grams, 0.013 mole) was added to a solution of p-toluenesulfonyl chloride (2.7 grams, 0.014 mole) in 25 milliliters of distilled pyridine at 0–5° C. After standing at 0° C. for 24 hours, the mixture was poured into 21 milliliters of conc. hydrochloric acid in 75 grams of ice and extracted with methylene chloride. The extract was washed with 10% sodium bicarbonate and water, dried over magnesium sulfate and concentrated in vacuo to give a gummy solid. Trituration with pentane yielded 4.6 grams (91.5%) of product. Recrystallization from methylene chloride and pentane gave 3.75 grams (75%) of white solid, melting point 130.0–131.0° C.

The infrared spectrum shows the tosylate absorption at 9.2μ and the characteristic diparaxylylene absorption at 12.4μ and 14.0μ. The NMR spectrum in chloroform-d shows resonance at 6.65–6.21 p.p.m. (diparaxylylene aromatic protons, multiplet); 8.0–7.3 p.p.m. (tosylate aromatic protons, 2 sets of 2 lines); 4.62–4.45 p.p.m. (benzylic and non-benzylic protons multiplet); 3.75–3.29 p.p.m. (benzylic and non-benzylic protons, multiplet); 3.04 p.p.m. (bridge protons, singlet); 2.43 p.p.m. (methyl protons, singlet); and 2.25 p.p.m. (benzylic and non-benzylic protons, singlet in an area ratio of 8:4:2:2:4:3:1.

*Analysis.*—Calcd. for $C_{24}H_{24}O_3S$ (percent): C, 73.50; H, 6.13. Found (percent): C, 72.89; H, 6.20.

EXAMPLE 6

1-methylene-[2.2]-paracyclophane 1-(tosyloxymethyl) - [2.2] - paracyclophane (1.0 gram, 2.6 millimoles) and 40 milliliters of 1 molar potassium t-butoxide were refluxed under nitrogen for 20 hours. The cooled mixture was added to 150 milliliters of water and extracted with ether. The extract was dried over magnesium sulfate and concentrated in vacuo to give a gum which was chromatographed on Florisil (70 grams, 60/100 mesh) with ether/pentane as eluant. The ether/pentane (2–5%) eluant yielded 0.15 gram (27%) of product. Sublimation (0.1 millimeter pressure, 90° C.) yielded 1-methylene-[2.2]-paracyclophane.

The infrared spectrum shows the characteristic [2.2]-paracyclophane absorptions at 12.4μ and 13.95μ. The NMR spectrum in chloroform-d shows resonance at 6.50 (aromatic protons, multiplet); 5.32–5.22 p.p.m. methylene protons, triplet); 3.85–3.75 p.p.m. (benzylic protons, triplet); and 3.03 p.p.m. (bridge protons, singlet) in an area ratio of 4:1:1:2.

EXAMPLE 7

1-carboxy-[2.2]-paracyclophane

The 1-(carbomethoxy)-[2.2]-paracyclophane of Example 1 was saponified in 95 percent ethanol solvent giving 1-carboxy-[2.2]-paracyclophane with a melting point of 187–188° C. after recrystallization from aqueous ethanol. The infrared and NMR spectra were in accord with the assigned structure. A direct comparison with authentic 4-carboxy-[2.2]-paracyclophane (melting point 221–223° C.) indicated that the two acids were different.

*Analysis.*—Calcd. for $C_{17}H_{16}O_2$ (percent): C, 80.96; H, 6.35. Found (percent): C, 80.44; H, 6.51.

EXAMPLE 8

1-(N,N-dimethylcarboxamido)-[2.2]-paracyclophane 1-carboxy-[2.2]-paracyclophane (5.4 grams 0.02 mole) was refluxed in 60 milliliters of thionyl chloride for 1.5 hours. The mixture was concentrated in vacuo, and the residue dissolved in 12 milliliters of methylene chloride to prevent hydrolysis. Dimethylamine was bubbled through 1 milliliter of this solution for 10 minutes. The mixture was concentrated in vacuo and triturated with methylene chloride. The solid salt was filtered off and the filtrate concentrated in vacuo. Trituration with ether/pentane yielded a yellow solid which was chromatographed on Florisil (15 grams, 60/100 mesh) with ether/pentane as eluant. The ether (100%) eluted 0.047 gram (24%) of the product Recrystallization twice from hot heptane and sublimation at 0.1 millimeter pressure and 120° C. yielded the analytical sample, melting point 120–123° C.

The infrared spectrum shows carbonyl absorption at 6.08μ and the characteristic diparaxylylene absorption at 12.3μ (broad band) and 13.92μ The NMR spectrum in chloroform-d shows resonance at 6.74–6.40 p.p.m. (aromatic protons, multiplet); and 3.29–2.71 p.p.m. (methyl, benzylic and non-benzylic protons, multiplet) in an area ratio of 8.13.

*Analysis.*—Calcd. for $C_{19}H_{21}NO$ (percent): C, 81.67; H, 7.59; N, 5.01. Found (percent): C, 81.77; H, 7.63; N, 4.77.

EXAMPLE 9

1,9(10)-dicarbomethoxy)-[2.2]-paracyclophane

[2.2]-paracyclophane (50.0 grams, 0.24 mole) and oxalyl chloride (150.0 grams, 1.20 moles) were heated at 80–90° C. in 800 milliliters of chloro benzene. Benzoyl peroxide (10.0 grams) was added at three 24 hours intervals. After 96 hours the mixture was concentrated in vacuo. The residual brown gum was dissolved in methylene chloride and 250 milliliters of methanol added to it. After 24 hours the mixture was concentrated in vacuo and the residue chromatographed on Florisil (110 grams, 60/100 mesh) with ether/pentane as eluant. Pure pentane eluted methyl benzoate as above while ether/pentane (5–60%) eluted 15 grams of crude product, which was sublimed at 0.1 millimeter pressure and 155° C. to give 11.4 grams (14.7% of white solid having a melting point of 90–130° C.

The infrared spectrum shows strong carbonyl absorption at 5.8μ, the characteristic paracyclophane absorption at 14.0 and a broad absorption at 12.2–12.4μ. The NMR spectrum in chloroform-d shows resonances at 6.75–6.37 p.p.m. (aromatic protons, multiplet), 4.7–3.81 p.p.m. (benzylic protons, multiplet), and 3.60–3.23 p.p.m. (benzylic protons, multiplet, and 3.77 p.p.m. (methyl protons, singlet) in an area ratio of 8:2:4:6.

*Analysis.*—Calcd. for $C_{20}H_{20}O_4$ (percent): C, 74.07; H, 6.17. Found (percent): C, 74.40; H, 6.30.

EXAMPLE 10

1,9-dihydroxymethyl-[2.2]-paracyclophane and 1,10-(dihydroxymethyl)-[2.2]-paracyclophane 1,9-(dicarbomethoxy)-[2.2]-paracyclophane and 1,10-(dicarbomethoxy) - [2.2] - paracyclophane (5.0 grams, 0.154 mole) in 50 milliliters of benzene was added dropwise to a stirring mixture of lithuim aluminum hydride (1.40 grams, 0.037 mole) in 70 milliliters of ether and refluxed for 48 hours. After cooling the excess lithium aluminum hydride was hydrolyzed by successive addition of 1.5 milliliters water, 1.5 milliliters 10% sodium hydroxide, and 4 milliliters water. The ethereal layer was decanted off and the inorganic product washed with methylene chloride. The combined organic extracts were dried over magnesium sulfate and concentrated in vacuo to give 2.6 grams of product. The inorganic product from the reaction was dissolved in 20% sulfuric acid and extracted with methylene chloride. The extract was washed with 10% sodium bicarbonate and water, dried over magnesium sulfate and concentrated in vacuo to give 1.45 grams of product. Both samples were sublimed at 0.1 millimeter pressure and 160° to give 3.33 grams (81.5%) of white solid, melting point 155–180°.

The infrared spectrum shows a strong hydroxyl absorption at 3.0μ and the characteristic diparaxylylene absorption at 12.32μ and 13.9μ.

*Analysis.*—Calcd. for $C_{18}H_{20}O_2$ (percent): C, 80.55; H, 7.53. Found (percent): C, 80.45; H, 7.27.

EXAMPLE 11

1,9-(ditoxyloxymethyl)-[2.2]-paracyclophane and 1,10-(ditosyloxymethyl)-[2.2]-paracyclophane 1,9-(dihydroxymethyl)-[2.2]-paracyclophane and 1,10-(dihydroxymethyl) - [2.2] - paracyclophane (3.14 grams, 0.012 mole) was added to p-toluenesulfonyl chloride (5.4 grams, 0.028 mole) in 40 milliliters of distilled pyridine at 0–5°. After standing at 0° for 24 hours, the mixture was added to 40 milliliters of concentrated hydrochloric acid in 140 grams of ice and extracted with methylene chloride, until all the insoluble material was dissolved. In some cases it proved more expedient to collect the insoluble portion thus lessening the quantity of solvent needed for extraction. The extract was washed with 10% sodium bicarbonate and water, dried over magnesium sulfate and concentrated in vacuo to give a gummy solid. Trituration with pentane yielded 6.15 grams (91.5%) of white solid. Recrystallization twice from hot ethylene dichloride gave the analytical sample, melting point 176° C. with decomposition. In the same experiment the more insoluble portion melts at 190° C. with decomposition although the infrared spectrum is identical with that of the lower-melting sample.

The infrared spectrum show the tosylate absorption at 9.14μ and the characteristic diparaxylylene absorptions at 12.38μ and 14.2μ.

*Analysis.*—Calcd. for $C_{32}H_{32}O_6S_2$ (percent): C, 66.63; H, 5.60. Found (percent): C, 66.46; H, 5.51.

EXAMPLE 12

10-acetoxy-[2.3]-paracyclophane 1-(tosyloxymethyl)-[2.2]-paracyclophane (12.0 grams, 0.03) mole was refluxed in dry acetic acid for 19 hours. The cooled mixture was added to 1200 milliliters of water and extracted with methylene chloride. The extract was washed with 10% sodium bicarbonate and water, dried over magnesium sulfate and concentrated in vacuo to give 8.15 grams (95%) yellow solid. Recrystallization from hexane and sublimation at 0.1 millimole pressure and 130° C. yielded 10-acetoxy-[2.3]-paracyclophane, having a melting point 146.5–148.0° C.

The infrared spectrum shows a strong carbonyl absorption at 5.8 and the characteristic paracyclophane absorptions at 12.38μ and 14.12μ. The NMR spectrum in chloroform-d shows resonance at 6.92–6.30 p.p.m. (aromatic protons, multiplet); 5.57–5.04 p.p.m. (non-benzylic proton, multiplet); 3.45–3.10 p.p.m. (benzylic protons, multiplet); 2.80–2.33 p.p.m. (benzylic protons, multiplet); 2.96 p.p.m. (bridge protons, singlet); and 1.15 p.p.m. (methyl protons, singlet) in an area ratio of 8:1:2:2:4:3.

*Analysis.*—Calcd. for $C_{19}H_{20}O_2$ (percent): C, 81.40; H, 7.25. Found (percent): C, 81.15; H, 7.09.

EXAMPLE 13

[2.3]-paracyclophane-10-ol

[2.3]-paracyclophane - 10 - acetate (7.0 grams, 0.025 mole) in 60 milliliters of 33% benzene/ether was added dropwise to a stirring mixture of lithium aluminum hydride (2.0 grams, 0.053 mole) in 100 milliliters of ether. After stirring at 25° for 24 hours, the excess lithium aluminum hydride was hydrolyzed by successive addition of 1 milliliter of water, 1 milliliter of 10% sodium hydroxide, and 5 milliliters of water. The ethereal layer was decanted off and the inorganic product washed with methylene chloride. The combined organic extracts were dried over magnesium sulfate and concentrated in vacuo to give 3.65 grams (63%) of product. Sublimation at 0.1 millimeter pressure and 115° gave [2.3]-paracyclophan-10-ol having a melting point 143–145° C.

The infrared spectrum shows hydroxyl absorption at 3.0μ and the characteristic paracyclophane absorption at 12.32μ and 14.12μ. The NMR spectrum in chloroform-d shows resonance at 6.80–6.30 p.p.m. (aromatic protons, multiplet); 4.50–3.91 p.p.m. (benzylic and non-benzylic protons, multiplet); 3.50–3.10 p.p.m. (benzylic and non-benzylic protons, multiplet); 2.98 p.p.m. (bridge protons, singlet); 2.77–2.41 p.p.m. (benzylic and non-benzylic protons, multiplet); and 1.44–1.17 p.p.m. (hydroxyl proton, singlet) in an area ratio of 8:1:2:4:2:1.

*Analysis.*—Calcd. for $C_{17}H_{18}O$ (percent): C, 85.80; H, 7.61. Found (percent): C, 85.44; H, 7.71.

EXAMPLE 14

[2.3]-paracyclophan-10-tosylate

[2.3]-paracyclophan-10-ol (0.6 gram, 2.42 millimoles) was added to a swirling solution of p-toluene sulfonyl chloride (.56 gram, 2.93 millimoles) in 3 milliliters of distilled pyridine at 0–5° C. After standing at 0° C. for 48 hours, the mixture was added to 35 milliliters of concentrated hydrochloric acid in 11 grams of ice and extracted with methylene chloride. The extract was washed with 10% sodium bicarbonate and water, dried over magnesium sulfate, and concentrated in vacuo to give a viscous liquid. Trituration with pentane yielded 0.85 gram (86%) of white solid. Recrystallization from methylene chloride and pentane yielded [2.3]-paracyclophan-10-tosylate.

The infrared spectrum shows the tosylate absorption at $9.2\mu$ and the characteristic paracyclophane absorption at $12.32\mu$ and $14.10\mu$. The NMR spectrum in chloroform-d shows resonance at 6.70–6.47 p.p.m. (aromatic protons, multiplet); 8.17–7.32 pp.m (tosylate aromatic protons, two sets of two lines); 3.6–3.1 p.p.m. (benzylic and non-benzylic protons, multiplet); 3.0 p.p.m. (bridge protons, singlet); 2.92–2.70 p.p.m. (benzylic and non-benzylic protons, multiplet); and 2.47 p.p.m. (methyl protons, singlet) in an area ratio of 8:4:3:4:3.

EXAMPLE 15

10-(2-dimethylaminoethoxy)-[2.3]-paracyclophane

Sodium hydride (50% in mineral oil, 0.9 gram) was added to a solution of [2.3]-paracyclophan-10-ol (0.9 gram, 5.8 millimoles) in 170 milliliters of dry benzene and stirred under nitrogen for 0.5 hour. $\beta$-Dimethylaminoethyl bromide hydrobromide (1.2 grams) was then added and refluxed under nitrogen for 24 hours. The mixture was cooled and 180 milliliters of 10% hydrochloric acid added dropwise. Aqueous ethanol was used to break up the resulting emulsion. The aqueous phase was separated out, basified with 10% sodium hydroxide and extracted with methylene chloride. The extract was washed with water, dried over magnesium sulfate and concentrated in vacuo to give 0.95 gram of yellow solid. Trituration with hot hexane gave product and an insoluble material, presumably the salt of the product. Recrystallization of the product from hot hexane yielded .48 gram (41%) of fluffy white crystals, melting point 87.0–87.5° C.

The infrared spectrum shows ether absorptions at $9.08\mu$ and $9.66\mu$ and the characteristic paracyclophane bands at $12.34\mu$ and $14.12\mu$. The NMR spectrum in chloroform-d shows resonance at 6.80–6.33 p.p.m (aromatic protons, multiplet); 4.0–3.2 p.p.m (benzylic and non-benzylic protons, multiplet); 2.98 p.p.m. (bridge protons, singlet); 2.77–2.45 p.p.m. benzylic and non-benzylic protons, multiplet); and 2.37 p.p.m. (methyl protons, singlet) in an area ratio of 8:3:4:5:6

*Analysis.*—Calcd. for $C_{21}H_{27}NO$ (percent): C, 81.51; H, 8.81; N, 4.52. Found (percent): C, 81.68; H, 8.85; N, 4.57.

EXAMPLE 16

[2.3]-paracyclophan-10-one

Chromic acid (0.5 gram) was added slowly and with stirring to 5 milliliters of distilled pyridine at 15–20° C. [2.3]-paracyclophan-10-ol (0.5 gram, 2.1 millimoles) was then added and the mixture stirred at 25° C. After 20 hours it was added to 90 milliliters of water and extracted with methylene chloride. The resultant emulsion was broken up by filtration through Filter-cel. The organic layer was washed with 10% hydrochloric acid and water, dried over magnesium sulfate and concentrated in vacuo to give 0.45 gram (90%) of yellow-brown solid. Sublimation at 0.1 millimeter pressure and 120° yielded 0.39 gram (79.5%) of white solid, melting point 95.5–96.5° C.

The infrared spectrum shows a strong carbonyl absorption at $5.90\mu$ and the characteristic paracyclophane absorptions at $12.4\mu$ and $14.1\mu$. The NMR spectrum in chloroform-d shows resonance at 6.86–6.33 p.p.m. (aromatic protons, multiplet); 3.70 p.p.m. (benzylic protons, singlet); and 2.97 p.p.m. (bridge protons, singlet) in an area ratio of 2:1:1.

*Analysis.*—Calcd. for $C_{17}H_{16}O$ (percent): C, 86.39; H, 6.84. Found (percent): C, 86.51; H, 7.27.

EXAMPLE 17

[2.3]-paracyclophan-10-one-oxime

[2.3]-paracyclophan-10-one (0.4 gram, 1.7 millimoles), hydroxylamine hydrochloride (0.4 gram), 4 milliliters of dry pyridine and 4 milliliters of absolute ethanol were refluxed together for 24 hours. The cooled mixture was added to 4 milliliters of conc. hydrochloric acid in 4.0 grams of ice and extracted with methylene chloride. The extract was washed with water, dried over magnesium sulfate and concentrated in vacuo to give 0.38 gram (89%) of product. The analytical sample was recrystallized twice from hot carbon tetrachloride to give a white solid, melting point 192.5–193.5° C.

The infrared spectrum shows hydroxyl absorption at $3.11\mu$ and the characteristic paracyclophane absorptions at $12.4\mu$ and $14.18\mu$.

*Analysis.*—Calcd. for $C_{17}H_{17}NO$ (percent): C, 81.23; H, 6.83; N, 5.57. Found (percent): C, 81.35; H, 6.87; N, 5.76.

EXAMPLE 18

Solvolysis of 1,9-(ditosyloxymethyl) - [2.2] - paracyclophane and 1,10-(ditosyloxymethyl)-[2.2] - paracyclophane 1,9-(ditosyloxymethyl)-[2.2]-paracyclophane and 1,10-(ditosyloxymethyl)-[2.2] - paracyclophane (18.7 grams, 0.032 mole) was heated for 72 hours at 94° in 407 milliliters of 58% 0.2 M sodium acetate/acetic acid in ethylene dichloride. The cooled mixture was poured into 900 milliliters of water and extracted with methylene chloride. The extract was washed with water, 10% sodium hydroxide, 10% sodium bicarbonate and water, dried over magnesium sulfate and concentrated in vacuo to give 22 grams of brown gum. Trituration with pentane and then ether yielded 6.35 grams (56%) of [3.3]-paracyclophan-2,11-diacetate. Sublimation at 0.1 millimeter pressure and 155° yielded the analytical sample, melting point 160–230° C.

The infrared spectrum shows a strong carbonyl absorption at $5.79\mu$ and the characteristic paracyclophane absorptions at $12.42\mu$ and $14.18\mu$. The NMR spectrum in chloroform-d shows resonance at 7.28–6.41 p.p.m. (aromatic protons, multiplet); 5.72–5.12 p.p.m. (non-benzylic protons, multiplet); 3.38–2.33 p.p.m. (benzylic protons, multiplet); 2.13 p.p.m. (methyl protons, multiplet); and 1.78–1.67 p.p.m. (benzylic protons, multiplet) in an area ratio of 8:2:7:5:6:0.5.

*Analysis.*—Calcd. for $C_{22}H_{24}O_4$ (percent): C, 74.96; H, 6.88. Found (percent): C, 74.63; H, 6.86.

After trituration the filtrate was chromatographed on Florisil (120 grams, 60/100 mesh) with ether/pentane as eluant. Pentane eluted the [3.3]-paracyclophan-2,10-diene and [3.3]-paracyclophane-2,11-diene as a white solid. Sublimation at 92° C. and 0.1 millimole pressure yielded .10 gram (1.3%) of material, melting point 127–128.5° C.

The infrared spectrum shows the characteristic paracyclophane absorptions at $12.45\mu$ and $14.08\mu$. The NMR spectrum in chloroform-d shows resonance at 7.0–5.58 p.p.m. (aromatic and vinyl protons, multiplet) and 3.65–3.42 p.p.m. (benzylic protons, multiplet) in an area ratio of 3:1.

*Analysis.*—Calcd. for $C_{18}H_{16}$ (percent): C, 93.06; H, 6.95. Found (percent): C, 92.84; H, 6.90.

Ether (2–5%) eluted 1.36 grams (15%) of [3.3]-paracyclophane-2-acetate-11-ene. Recrystallization twice from methanol and water yielded white platelet crystals, melting point 104.5–105.5° C.

The infrared spectrum shows a strong carbonyl absorption at 5.76μ and the characteristic paracyclophane absorptions at 12.28μ and 14.1μ. The NMR spectrum in chloroform-d shows resonance at 6.92–5.10 p.p.m. (aromatic, vinyl and non-benzylic protons, multiplet); 3.61–2.29 p.p.m. (benzylic protons, multiplet) and 2.10 p.p.m. (methyl protons, singlet) in an area ratio of 11:6:3.

*Analysis.*—Calcd. for $C_{20}H_{20}O_2$ (percent): C, 82.20; H, 6.85. Found (percent): C, 81.95; H, 7.07.

Higher ether concentrations eluted 0.6 gram of 3,3-paracyclophan-2,11-diacetate. (Total yield, 61.4%.)

EXAMPLE 19

[3.3]-paracyclophan-2,10-diene and [3.3]-paracyclophan-2,11-diene

[3.3]-paracyclophan-2,11-diacetate (0.1 gram, 0.28 millimole) was passed through a quartz tube filled with quartz glass wool at 615° C. and 0.1 millimole pressure. The product (0.05 gram, 74%) was chromatographed on Florisil and sublimed at 0.1 millimeter pressure and 115° C. to yield a white solid, melting point 127–128.5° C.

The infrared and NMR spectra are identical with those of the diene obtained in the solvolysis of 1,9-(ditosyloxymethyl)-[3.3]-paracyclophane and 1,10-(ditosyloxymethyl)-[3.3]-paracyclophane.

EXAMPLE 20

[3.3]-paracyclophan-2,11-diol

[3.3]-paracyclophan-2,11-diacetate (1.0 gram, 2.84 millimoles) was added to a stirring mixture of lithium aluminum hydride (0.5 gram, 0.013 mole) in 110 milliliters of ether and refluxed for 24 hours. The excess lithium aluminum hydride was hydrolyzed by successive addition of 0.5 milliliter water, 0.5 milliliter 10% sodium hydroxide and 3.0 milliliters water. The ethereal layer was decanted off and the inorganic product washed with methylene chloride. The combined organic extracts were dried over magnesium sulfate and concentrated in vacuo to give 0.33 gram of product. The inorganic product was dissolved in 20% sulfuric acid and extracted with methylene chloride. The extract was washed with 10% sodium bicarbonate and water, dried over magnesium sulfate and concentrated in vacuo to give 0.34 gram of product. (Total yield, 0.67 gram (88%)).

The infrared spectrum shows hydroxyl absorption at 3.0μ and the paracyclophane absorptions at 12.41μ and 14.25μ.

EXAMPLE 21

[3.3]-paracyclophane-2,11-dione

Chromic acid (1.70 grams) was added slowly to 17.0 milliliters of dry pyridine at 15–20°. [3.3]-paracyclophan-2,11-diol (0.85 gram, 3.17 millimoles) in 17 milliliters of dry pyridine was added to the slurry and stirred for 20 hours. The mixture was then added to 160 milliliters of water and extracted with methylene chloride. The emulsion was broken up by filtration through Filtercel. The organic extract was meshed with 10% hydrochloric acid and water, dried over magnesium sulfate and concentrated in vacuo to give 0.75 gram of crude product. Sublimation (0.1 millimeter pressure, 180° C.) yielded 0.55 gram (67%) of white solid. Recrystallization from hot benzene/chlorobenzene gave the analytical sample, melting point 264–270°.

The infrared spectrum shows carbonyl absorption at 5.92μ and the characteristic paracyclophane absorption at 12.4 and 14.28μ. The NMR spectrum in chloroform-d shows resonance at 7.15–6.55 p.p.m. (aromatic protons, multiplet) and 4.15–3.60 p.p.m. (benzylic protons, multiplet) in an area ratio of 1:1.

*Analysis.*—Calcd. for $C_{18}H_{16}O_2$ (percent): C, 81.80; H, 6.09. Found (percent): C, 82.01; H, 6.46.

Although the invention has been illustrated by the foregoing examples it is not to be construed as being limited to the materials employed therein, but rather the invention encompasses the generic area as hereinbefore disclosed. Various modifications and embodiments of this invention can be had without departing from the spirit and scope thereof.

What is claimed is:
1. [2.3]-paracyclophan-10-tosylate.

References Cited
UNITED STATES PATENTS

| | | | |
|---|---|---|---|
| 3,117,168 | 1/1964 | Gorham | 260—668 |
| 3,155,712 | 11/1964 | Yeh | 260—465 |
| 3,164,625 | 1/1965 | Pollart | 260—465 |
| 3,198,844 | 8/1965 | Enede | 260—668 |
| 3,221,068 | 11/1965 | Gorham | 260—649 |

OTHER REFERENCES

Cram et al., J.A.C.S. vol. 73, pp. 5691–5704 (1951).
Cram et al., J.A.C.S. vol. 81, pp. 5963–5971 (1959).
Dewhirst et al., J.A.C.S. vol. 80, pp. 3715–3725 (1958).
Kharasch et al., J.A.C.S. vol. 64, pp. 329–333 (1942).
Kharasch et al., J.A.C.S. vol. 64, pp. 1621–1624 (1942).

LEON ZITVER, Primary Examiner

L. B. DE CRESCENTE, Assistant Examiner

U.S. Cl. X.R.

260—2 EP, 30.4 EP, 45.8 A, 348.5 R, 469, 476 C, 488 CD, 515 R, 515 P, 544 M, 557 B, 566 A, 570.9, 570.8 R, 571, 586 A, 618 R, 668 R